Jan. 20, 1942.  J. A. HEIDBRINK  2,270,523
GAS CONTROL MEANS FOR ANESTHETIZING MACHINES
Filed Jan. 29, 1940  8 Sheets-Sheet 1

Inventor:
Jay A. Heidbrink.
By A. A. Whiteley
Attorney.

Jan. 20, 1942. J. A. HEIDBRINK 2,270,523
GAS CONTROL MEANS FOR ANESTHETIZING MACHINES
Filed Jan. 29, 1940 8 Sheets-Sheet 2

Inventor:
Jay A. Heidbrink
By
Attorney

Jan. 20, 1942.   J. A. HEIDBRINK   2,270,523
GAS CONTROL MEANS FOR ANESTHETIZING MACHINES
Filed Jan. 29, 1940   8 Sheets-Sheet 3
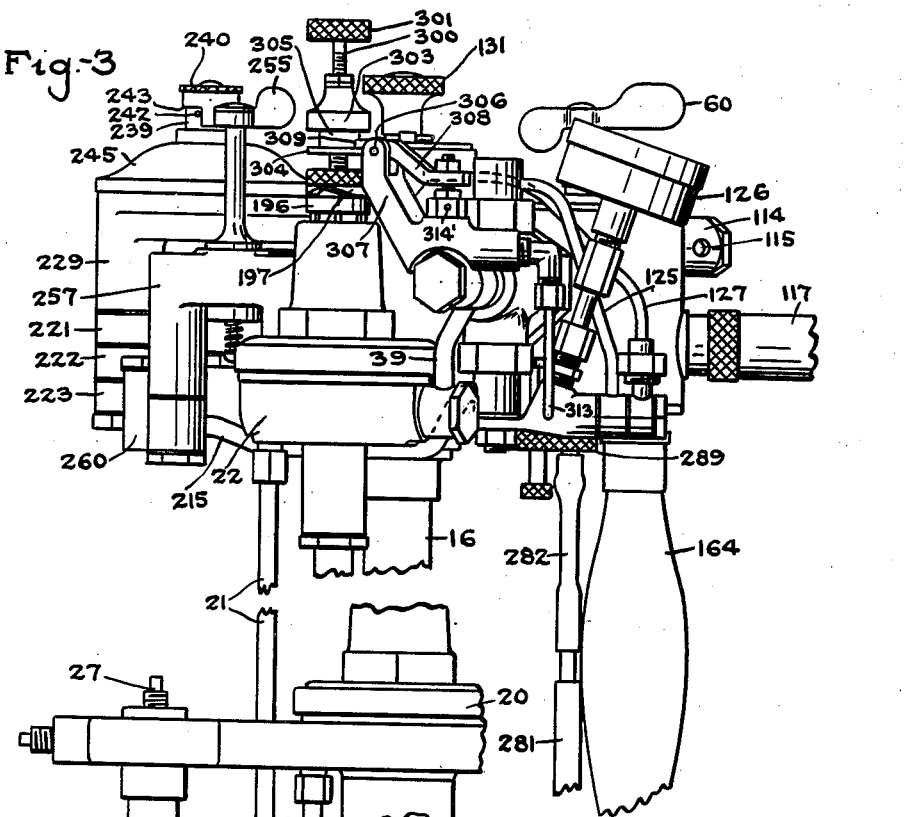
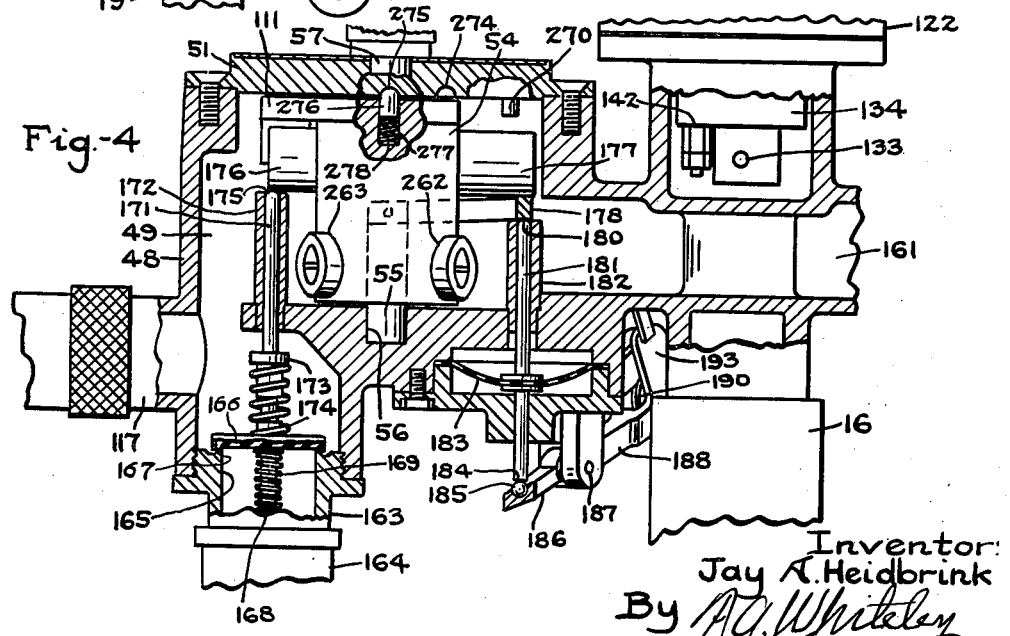
Inventor:
Jay A. Heidbrink
By A.O. Whiteley
Attorney.

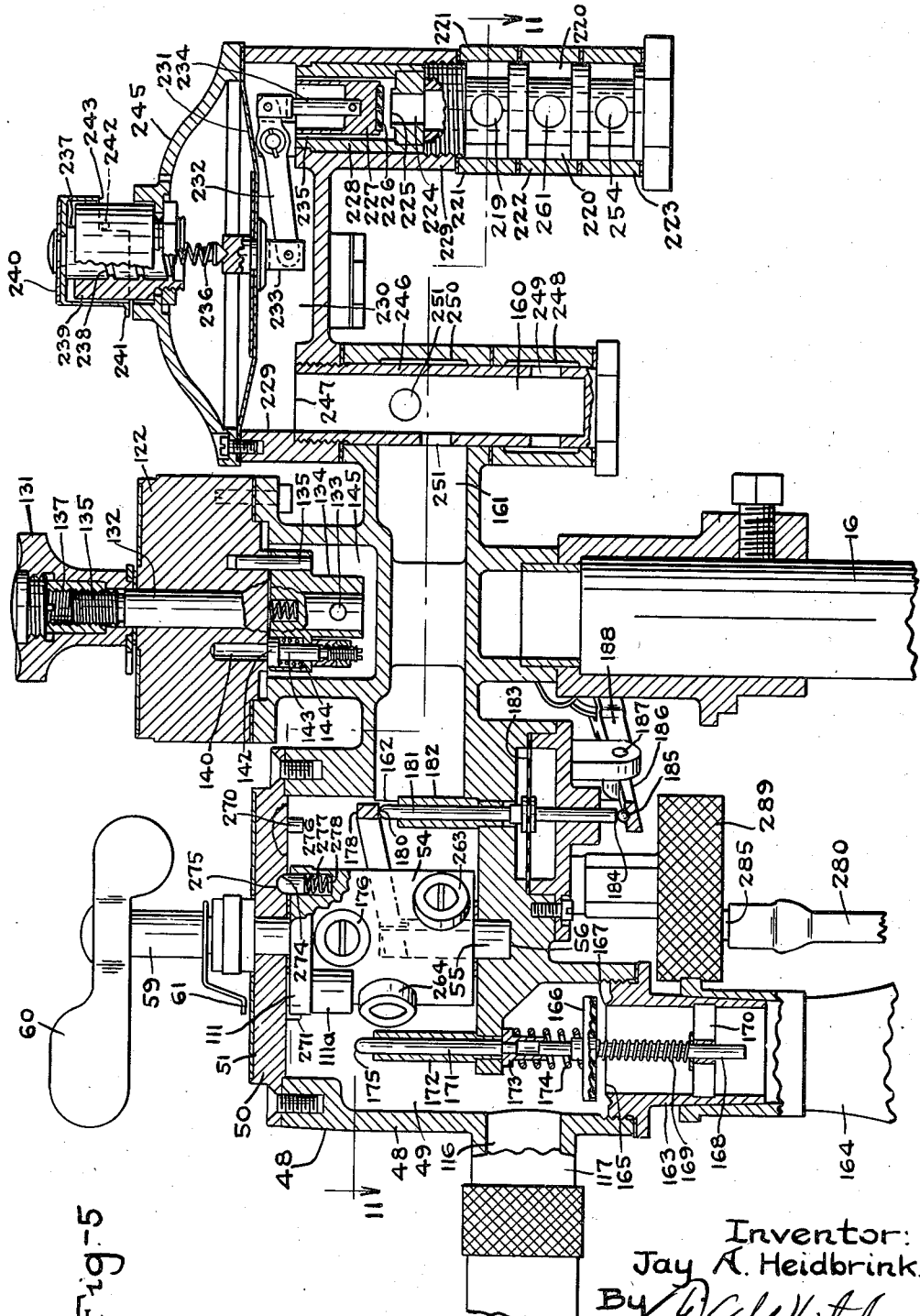

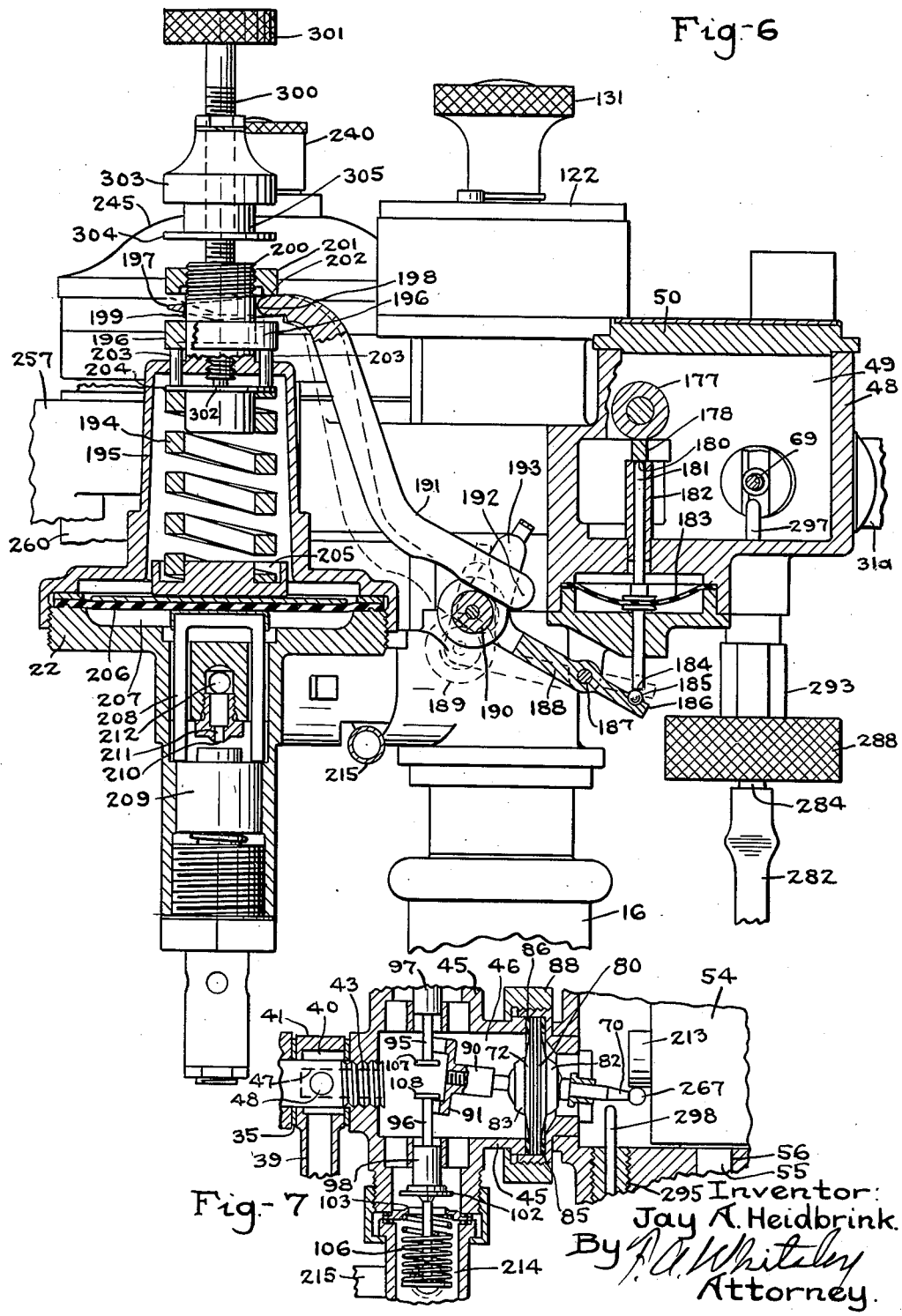

Jan. 20, 1942.　　　J. A. HEIDBRINK　　　2,270,523
GAS CONTROL MEANS FOR ANESTHETIZING MACHINES
Filed Jan. 29, 1940　　　8 Sheets-Sheet 6

Inventor:
Jay A. Heidbrink.
By [signature]
Attorney.

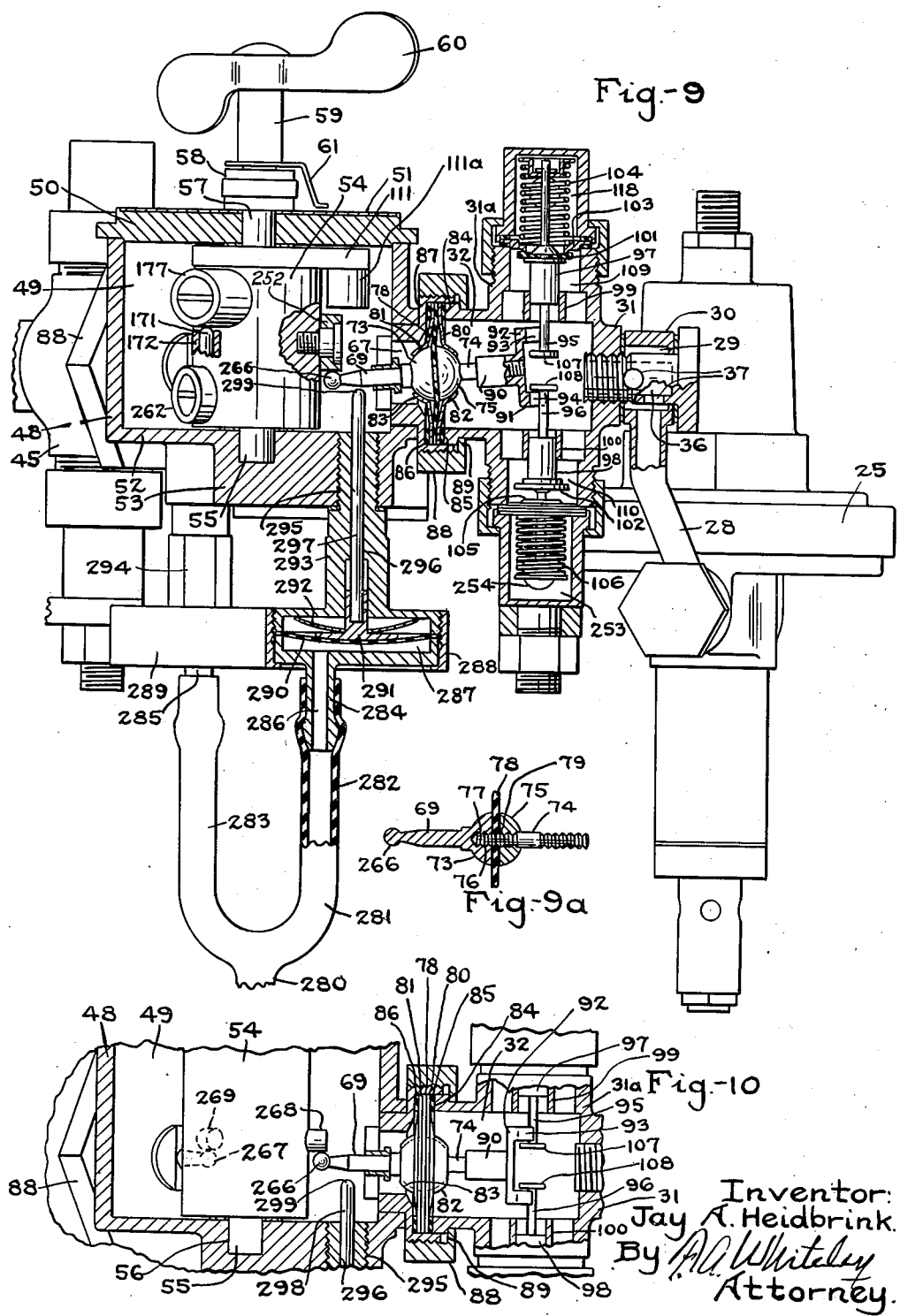

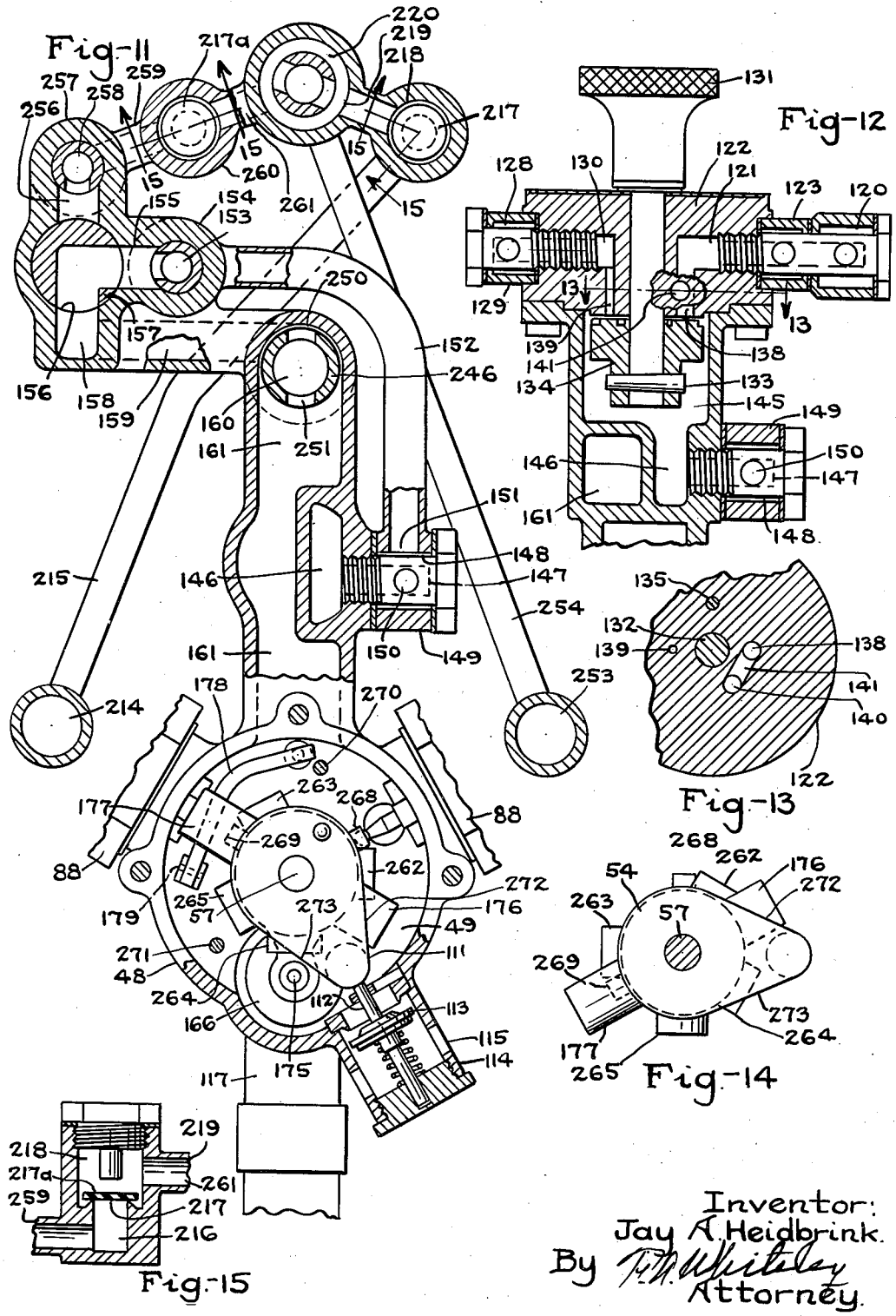

Patented Jan. 20, 1942

2,270,523

UNITED STATES PATENT OFFICE 2,270,523

GAS CONTROL MEANS FOR ANESTHETIZING MACHINES

Jay A. Heidbrink, Minneapolis, Minn., assignor to Air Reduction Company, Incorporated, a corporation of New York Application January 29, 1940, Serial No. 316,163

13 Claims. (Cl. 128—203)

My invention relates to gas control means for anesthetizing machines, and has for its object to provide in combination with sources of supply of anesthetizing gases such as nitrous oxide and oxygen, a single manually controlled member by which a suitably proportioned mixture of the gases may be delivered to the patient either continuously, or intermittently in response to the patient's breathing, and by which either gas taken by itself may be delivered directly to the patient intermittently in response to the patient's breathing.

In gas anesthesia it is the practice followed for the results desired to have the patient breathe a sufficient volume of the anesthetizing gas, as nitrous oxide, to produce the desired depth of anesthesia and at the same time to deliver to the patient, mixed with such desired amount of anesthetizing gas, sufficient oxygen to maintain a proper degree of metabolism effected in the alveolar regions of the lungs. The proportions of the mixture in any individual case, having in mind the degree of anesthesia required, are determined by the anesthetist. The mixture may be delivered to the patient in a continuous stream, or it may be delivered intermittently in response to the patient's inhalation, and either of these methods of delivery may be desired by anesthetists under certain conditions. It is, therefore, an object of my invention to provide in combination with means for producing a mixture of an anesthetizing gas, such as nitrous oxide and oxygen in proper proportions, means controlled by the anesthetist whereby either continuous delivery of the mixture or intermittent delivery in response to the breathing of the patient may be had as the anesthetist may determine.

It is obvious that if the patient receives too much of the anesthetizing gas in proportion to the amount of oxygen in the mixture a condition may result in which there might be danger of too deep anesthesia or possible asphyxiation. This condition may arise in the anesthetizing of any given patient, and it is highly important for the anesthetist to be able promptly and effectively to remedy it. It is a further object of my invention, therefore, to provide means whereby when the depth of anesthesia becomes too great, pure oxygen may be delivered to the patient directly in response to the patient's breathing, and with the rebreathing bag cut from the breathing line, which will quickly correct the difficulty and remove the above noted dangers, so that after one or two breaths of the direct supply of pure oxygen, the machine can be turned back to the delivery of the anesthetizing mixture, either in a continuous stream or intermittently, and the mixture itself, as the same goes to the patient and as it exists in the rebreathing bag, will not have its proportions changed.

It will be apparent that if the rebreathing bag were open to the breathing line when pure oxygen is delivered, there might be too much dilution of the oxygen with nitrous oxide to effect the quick resuscitation demanded. Hence, it is an object of my invention to provide means operating conjointly with the means for delivering pure oxygen which will cut out the rebreathing bag from the breathing line.

On the other hand, if the proportion of oxygen delivered be too great, the anesthesia of the patient might be lightened to a point where he is conscious of pain. Again when this condition arises, it is highly important for the anesthetist to be able to promptly and effectively increase the volume of anesthetizing gas so as to prevent such failure of anesthesia. Hence, it is a further object of my invention to provide means whereby, when it is apparent the anesthesia is too shallow and the patient is approaching consciousness, pure anesthetizing gas, such as nitrous oxide, may be delivered to the patient directly in response to the patient's breathing and thereby restore the degree of anesthesia desired, and at the same time not affect the predetermined mixture of gases otherwise going to the patient.

In adjusting the mask and appliances to the patient before anesthetizing the patient begins, and in some instances after the anesthetizing operation has been completed, it may be desirable to have the gases shut off entirely and yet permit the patient, with the mask in position, to breathe air for a time, and it is an object of my invention to provide simple means under the control of the operator for effecting this result.

It will be apparent that these changes must be made quickly and that complications of mechanism in the machine whereby uncertainty as to which change is being effected or how it is to be effected, should be avoided. In that connection it is an important object of my invention to provide a single controlling valve adapted to take any one of five positions plainly indicated on the dial, to wit, a position designated as "Shut" wherein delivery of gas is eliminated and the patient may breathe air; a position designated "Mixture" wherein the predetermined proportions of the anesthetizing gas mixed with oxygen are fed to the patient, continuously or intermittently in response to breathing as desired; a position marked "Patient control" wherein the mixture goes to the patient either continuously or intermittently, but the actual delivery of gas mixture is controlled by the patient; a position marked "O₂ direct" wherein pure oxygen goes directly to the patient intermittently in response to the patient's breathing; and a position marked "Direct N₂O" wherein nitrous oxide goes directly to the patient intermittently in response to the patient's breathing.

It is a further object of my invention to provide means for delivering the anesthetizing gas, such as nitrous oxide, either in mixture with oxygen or alone, wherein, when desired, the operator may multiply the volume of nitrous oxide going to the patient beyond the capacity of normal proportioning delivery.

It is a further object of my invention to provide a proportioning valve wherein the volume of nitrous oxide going to the patient may be determined and which includes indications showing the amount of nitrous oxide being delivered so that the valve is capable of measuring the nitrous oxide; and to provide in conjunction with such means of delivering measured nitrous oxide, a gage which, subject to the pressure of nitrous oxide which is being measured and delivered, will display the word "On," and which, when no measured nitrous oxide is being delivered, will shift and display the word "Off."

It is a further object of my invention to provide controllable means adapted to be operated at the time of operation of the automatic means for giving oxygen intermittently in response to breathing, which shall greatly multiply the flow of oxygen.

The full objects and advantages of my invention will appear in connection with the detailed description thereof which will now be given, and the novel features of combinations by which the above indicated advantageous results are obtained, are particularly pointed out in the claims, it being understood that the specific means shown are not to be regarded as limiting the invention in any way within the scope of the claims.

In the drawings illustrating an application of my invention in one form:

Fig. 3 is an elevation view similar to Fig. 2 taken from the opposite side thereof.

Fig. 4 is a sectional elevation view taken on line 4—4 of Fig. 1, showing the position of the parts when direct oxygen is being delivered and the rebreathing bag is shut.

Fig. 5 is a sectional elevation view taken straight through the machine on line 5—5 of Fig. 1.

Fig. 6 is a sectional elevation view taken across the machine on line 6—6 of Fig. 1.

Fig. 7 is a fragmentary sectional elevation view taken on line 7—7 of Fig. 1 with the valve parts indicated as in position for direct flow of oxygen.

Fig. 9 is a sectional elevation view taken on line 9—9 of Fig. 1 and showing corresponding parts in a different position from that in which they are shown in Fig. 8, to wit, in the position for delivering direct nitrous oxide.

Fig. 9a is a longitudinal sectional view taken through the hemispheres along the shanks secured to the hemispheres.

Fig. 10 is a partial elevation view similar to Fig. 7 showing the parts in neutral or shut position wherein the patient is breathing air.

Fig. 11 is a sectional plan view through the main valve casing taken on line 11—11 of Fig. 5 with the valve in shut position showing how the system is opened to atmosphere for breathing air.

Fig. 12 is a sectional elevation view taken on line 12—12 of Fig. 1 showing the center valve control for supplying desired proportions of oxygen and nitrous oxide.

Fig. 13 is a sectional plan view taken on line 13—13 of Fig. 12.

Fig. 14 is a detail plan view of hand operated control valve member with the operating shaft in section.

Fig. 15 is a detail sectional view taken on lines 15—15 of Fig. 11.

Figure 2:
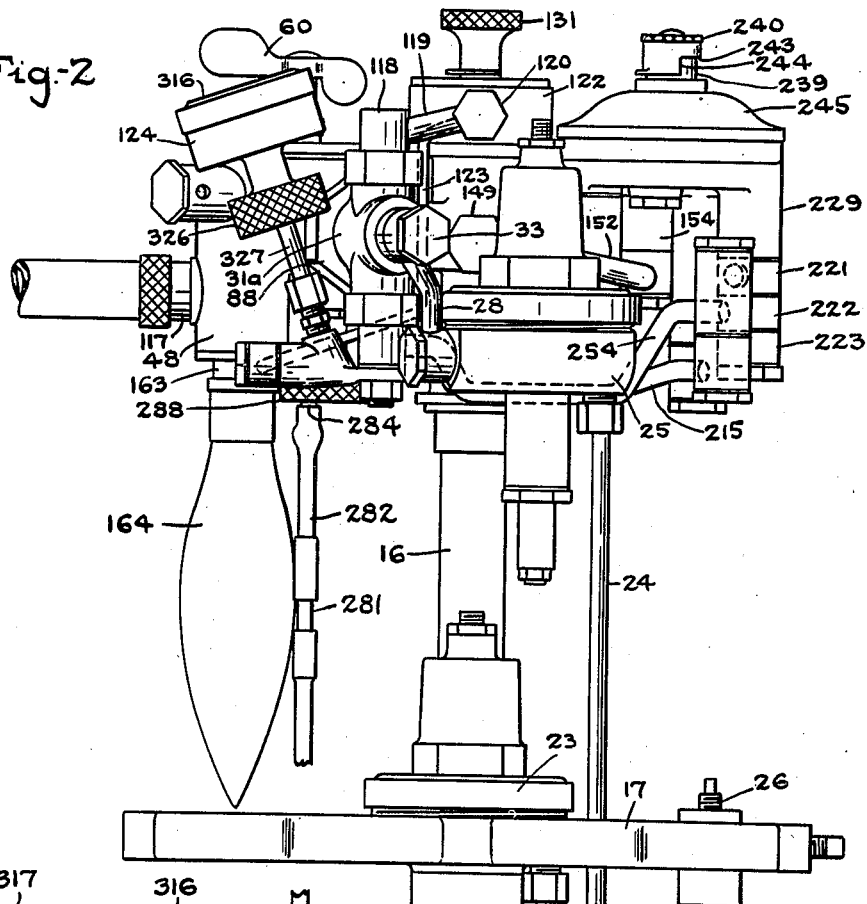
Fig. 2 is a side elevation view of the invention taken in connection with a supporting standard and showing the source of supply of gas.

As shown in Fig. 2 a standard 16 provides the customary yoke 17 which supports tanks of gas, as tank 18 of nitrous oxide and a similar tank of oxygen 19, Fig. 3. The oxygen is conducted in a customary manner to a reducing valve regulator 20 from which it leads through pipe 21 to regulator valve mechanism 22, and the nitrous oxide goes also in a customary manner to pressure reducing regulator 23 from which it goes by pipe 24 to regulating valve 25, Fig. 2. The inlet of gas from tanks 18 and 19 is controlled by customary valve mechanism 26 and 27. The nitrous oxide goes through a pipe 28 to a valve chamber 29 within a casing 30. The casing 30 is held upon a boss 31 at the end of a casing 31a enclosing a valve chamber 32 by means of a bolt 33 threaded at 34 into the boss 31. The chamber 30 is secured in gas-tight manner by being pressed against a washer 35. The bolt 33 is hollow or provided with an internal chamber 36, Fig. 9, into which open a series of holes 37 so that the nitrous oxide gas coming from the pressure reducer 25 passes into chamber 32.

Figure 8:
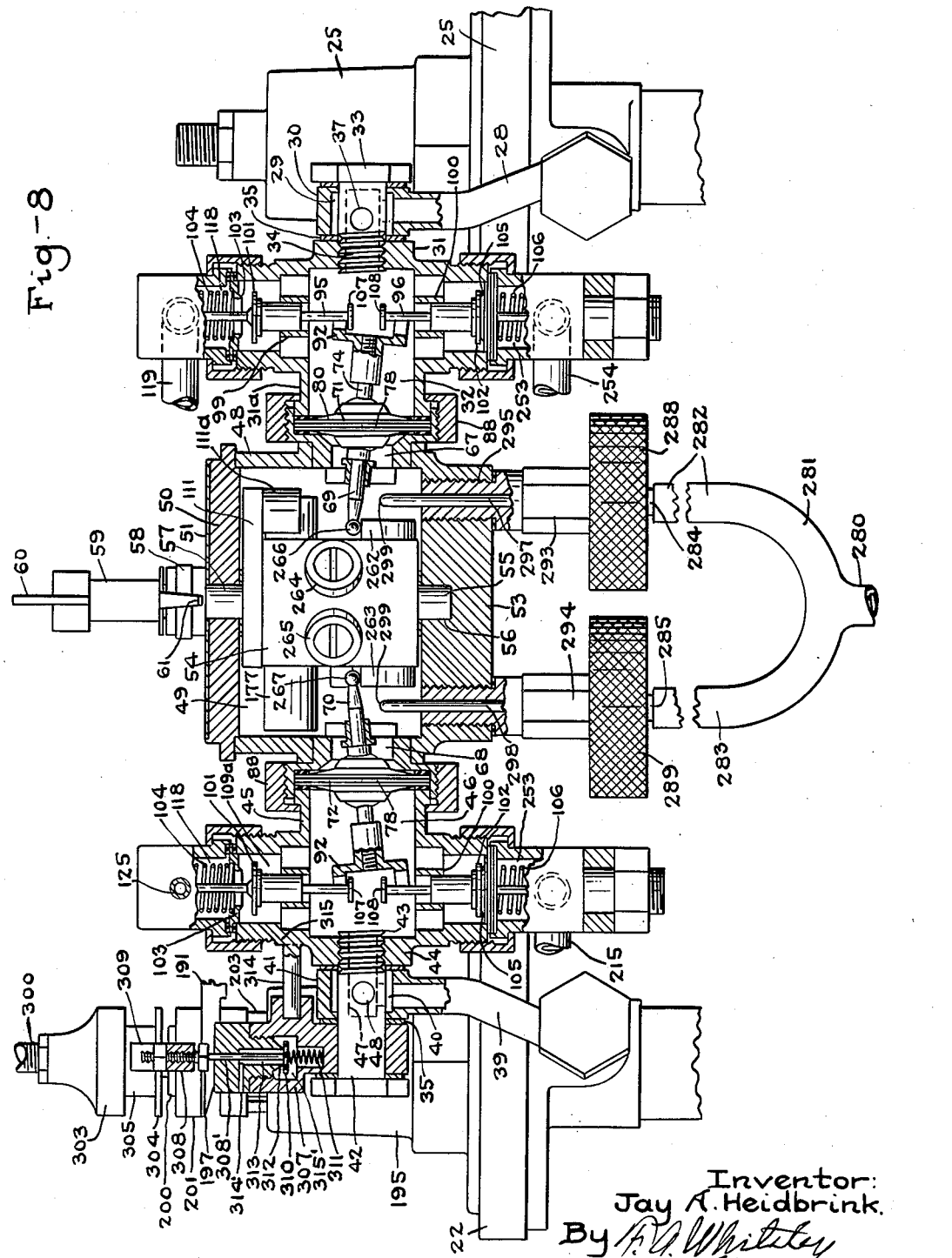
Fig. 8 is a sectional view on line 8—8 of Fig. 1, it being noted that this line runs angularly to pass through the two sets of valve operating means and that the valves are shown as being operated for continuous flow of mixture.

Similarly, Figs. 7 and 8, oxygen coming from regulating reducing valve 22 passes through pipe 39 to chamber 40 within a casing 41 which is held positioned by a bolt 42 threaded at 43 into a boss 44 on the end of a casing 45 forming a valve chamber 46. The bolt 42 has a central recess indicated in dotted lines at 47, Fig. 8, and holes 48 lead from chamber 40 to this recess by means of which the oxygen gas coming through pipe 39 is delivered to chamber 46. As clearly shown in Figs. 1 and 8, the valve chambers 32 and 46 and their casings 31a and 45 are symmetrically arranged in an angularly disposed manner at each side of a central cylindrical casing 48 forming chamber 49.

Figure 1:
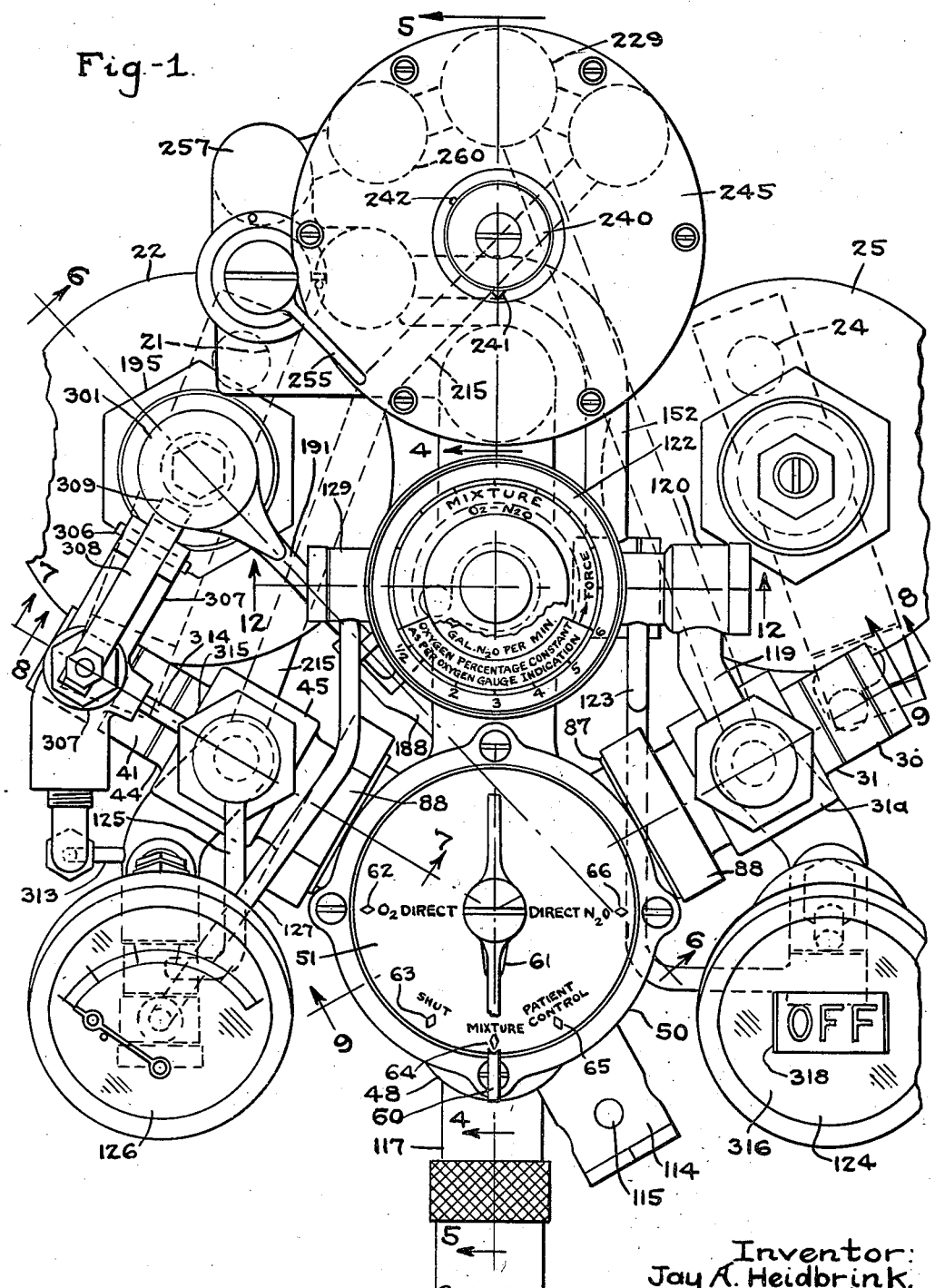
Fig. 1 is a top plan view of a mechanism embodying my invention with some parts indicated in dotted lines.

The chamber 49 in addition to the cylindrical walls 48 is fitted with a heavy closure disc 50 having on its surface a dial 51, and there is formed integrally with the cylindrical walls 48 a bottom wall 52 which is provided with a thickened portion 53, as best shown in Fig. 9. A drum 54 has a lower boss 55 which seats in a supporting depression 56 formed in a thickened bottom wall portion 53. A shaft 57 is continued through top plate 50 being secured for rotation about a vertical axis by a nut assemblage 58. An extension 59 from shaft portion 57 carries an operating finger piece 60. An indicator needle 61 extends parallel with the handle 60 and is adapted to cooperate with markings on the dial showing the five positions of the drum 54 and the parts operated thereby. These positions, as clearly indicated in Fig. 1, are: for direct oxygen delivered intermittently in response to breathing, at the point marked 62; for shut-off when the machine is inoperative and patient may get air, at the point marked 63; for mixture when the patient will get a mixture of gases, either continuous flow or intermittent flow, as determined by the operator by means later to be described, at the point marked 64; for patient control when the patient can himself control the flow of mixture, either intermittently or continuously, as determined by the anesthetist, at the point marked 65; and for pure nitrous oxide administered directly by intermittent flow at the point marked 66.

A passageway 67 connects the chamber 32 with the chamber 49; and a similar passageway 68 connects the chamber 46 with the chamber 49. Through these passageways extend respectively operating arms 69 and 70 which are adapted to be moved by contact with portions thereof within chamber 49 by members carried on or in connection with the drum 54. Since the chambers 32 and 46 are adapted to contain gas at relatively considerable pressure, it is essential that the movements of members 69 and 70 may be effected while at the same time keeping the chambers 32 and 46 effectively sealed. The means of accomplishing this is shown in Figs. 8 and 9, in which the sealing means for chamber 32 is referred to generally by the reference numeral 71 and the sealing means for the chamber 46 is referred to generally by the reference numeral 72. Since these means are identical, similar reference numerals will be applied for both such means.

As shown in Figs. 9 and 9a, the member 69 has integrally united therewith a hemisphere 73 of a ball-like member. A shank 74 is threaded through and integrally secured to a second hemisphere 75 of the ball-like member and is provided with a threaded extended portion 76, which is adapted to be screwed into a threaded hole 77, Fig. 9a, in the hemisphere 73. A flexible rubber disc 78 is provided with a central hole 79 through which the threaded extension 76 extends. It follows that when the two hemispheres are screwed tightly together by the above indicated means, the rubber disk 78 will be firmly held between the hemispheres in gas-tight relation thereto. A pair of circular plate-like members 80 and 81 are formed with socket portions 82 and 83 of substantial semispherical contour adapted to embrace the hemisphere sections 73 and 75 to produce in effect a ball and socket joint. The members 80 and 81 are of the same diameter as the rubber disc 78 and extend over an annular seat 84 on the end of casting 31a or 45. A pair of packing washers 85 and 86 are squeezed between the annular seat 84 and the inner wall of a member 87 by means of a nut 88 engageable with an annular rim 89 on frame member 31a, or 45. By this means the member 69 is extended through member 74 into the gas chamber 32 or 46 and is supported for free movements upon the ball and socket joint formed by hemispheres 73, 75 and portions 82, 83 of members 80 and 81. Upon the member 74 is secured a hub 90 extended into fork arms 91 and 92 which have portions 93 and 94 that embrace shafts 95 and 96. The shaft 95 is formed with an enlarged portion 97 guided in a cylinder 99 and the shaft 96 is formed with an enlarged portion 98 guided in a cylinder 100. The member 97 carries a valve disc 101 and the member 98 carries a valve disc 102. Valve disc 101 is normally held in engagement with valve seat 103 by means of spring 104 and valve disc 102 is similarly held in engagement with valve seat 105 by means of spring 106. Upon shaft 95 is a head 107 adapted to be engaged by the fork 93 of arm 92, and correspondingly upon shaft 96 is a head 108 adapted to be engaged by the fork 94 of the arm 91.

The chamber 32 filled with nitrous oxide, as heretofore described, is in communication with a passageway 109 leading to the valve 101, and likewise is in communication with a passageway 110 leading to the valve 102. From the above it will be apparent that chamber 32, though sealed gas-tight at its end, has within it a continuation of member 69 through shaft continuation 74 which is fulcrumed upon the ball and socket joint formed by members 73, 75 and 80, 81, whereby operation of member 69 will rock the fork members 93 and 94 in one or the other direction, causing them to engage either the head 107 or the head 108 to open valve 101 or valve 102 to permit flow of nitrous oxide gas in a manner hereinafter described. Obviously the similar parts enter oxygen chamber 46 and seal it and permit operation of similarly numbered and like parts for permitting flow of gas as is true of the nitrous oxide.

From the above it will be apparent that when the parts are in neutral position, as indicated in Fig. 10, and indicated on the dial as "Shut" the gas chambers 32 and 46 will be sealed and neither oxygen nor nitrous oxide can pass to the patient. In such a situation however, the drum 54 on shaft 57 will have carried a cam member 111 to engage a valve stem 112 which opens a valve 113 in an extension member 114 formed with inlet air openings 115, see Figs. 1 and 11. This permits air to flow into the chamber 49 within cylinder 48 and from that chamber through an opening 116 to the main breathing tube 117. Hence when the handle 64 and indicator 61 are set at the "shut" position the patient does not require removal of the mask but can continue to breathe atmospheric air in the manner above pointed out. It will also be clear from the above description that no gas, either nitrous oxide or oxygen separately, or in suitably proportioned mixtures, whether delivered continuously or intermittently, can go to the patient except through the gas distributor chambers 32 and 46.

In the position of the parts shown in Fig. 8 where valves 101 have been operated to the open position, the machine is set to deliver gases to form a mixture thereof. For nitrous oxide the gas goes from valve chamber 118 through a pipe 119 to a chamber 120, Fig. 12, and thence to a chamber 121 in proportioning valve block 122. A pipe 123, Figs. 1 and 12, leads to a gage 124 which indicates that nitrous oxide pressure is present in the proportioning valve. As best shown in Fig. 1, oxygen, for mixture purposes, flows through pipe 125 and gage chamber 126, thence back through pipe 127 to chamber 128 formed in casing 129 from which it flows to proportioning chamber 130 in proportioning valve block 122. The proportioning valve of which the block 122 is part is well known, and forms no part of this invention excepting so far as it is employed with other instrumentalities to provide for quick supply of mixture as distinguished from single gases. As best shown in Figs. 5 and 12, this proportioning valve is operated by a thumb 131 which carries a shaft 132 pinned at 133 to a valve block 134. The valve block 122 and valve block 134 are pinned together in slidable relation by a pin 135, Fig. 5. In this manner the valve block 134 is held from rotation with the shaft or valve stem 132.

The shaft 132 is provided with a threaded end 135 which is adapted to engage the internal threads 137 on the hand nut 131. The result is that when hand nut 131 is turned, it has the effect of moving the upper face of valve block 134 away from the lower face of main valve block 122 a predetermined distance to proportion the flow of gases therefrom. As shown in Figs. 12 and 13, a port passage 138 leads from the nitrous oxide chamber 121 in valve block 122 and a port passage 139 leads from the oxygen chamber 130 in valve block 122. The port 139 is of smaller diameter than the port 138 to compensate for relatively smaller volume of oxygen than of nitrous oxide, and for the fact that oxygen is a freer flowing gas. As shown in Fig. 12, the movable valve block 134 will be moved equal distances from the outlets of ports 138 and 139 with the result that the circumferential areas of the annular space between the port openings and the movable valve block 134 will determine the area of flow openings.

When it is desired to give a large volume of nitrous oxide to add to the mixture being delivered to the patient, a second port 140 connected with port 138 by a channel 141 may be employed. This second port, see Fig. 5, is normally closed by a valve head 142 on the top of a valve stem 143 pressed by means of a spring 144 against the port opening of 140. This spring has a capacity to move the valve head 142 a short distance only, so that when the valve is being used for proportioning, the port 140 will remain closed and all nitrous oxide be delivered through port 138. When, however, it is desired to give a large and sudden flow of nitrous oxide and the thumb screw 131 is turned clear around, the valve head 142 will be withdrawn from the opening of port 140 and nitrous oxide will flow through both ports 138 and 140.

The nitrous oxide and oxygen are formed into a uniform mixture in the mixing chamber 145. An extension of this mixing chamber 146, Figs. 11 and 12, opens into an interior passage 147 of a bolt extending through a chamber 148 formed by a casing member 149. The bolt is provided with apertures 150 leading from the interior chamber 147 by means of which the gas mixture is enabled to leave chamber 148 through port 151 and pass through pipe 152, Fig. 11. From this pipe the gas mixture passes into a vertical passageway 153 in a boss 154 having connection through passageway 155 with the interior of valve chamber 156. A three-way valve 157 is located in the valve chamber 156. In the position of Fig. 11 this valve, receiving gas mixture from passageway 115, delivers it to a passageway 158 from which it goes through passageway 159 into a vertical passageway 160 into a horizontal passageway 161 underlying the proportioning valve 122 and leading at 162 into the chamber 49. From chamber 49, as clearly shown in Figs. 5 and 11, the gas mixture goes through port 116, to the main breathing tube 117.

As shown in Fig. 5, a nipple 163 forms a support for a rebreathing bag 164. The opening 165 into the rebreathing bag is normally open but is adapted to be closed when desired by a valve member 166 engageable with a valve seat 167 surrounding the opening 165. Valve member 166 is on a valve stem 168 and is held in open position, as shown in Fig. 5, by a spring 169 surrounding the valve stem and engaging a spider 170 in the nipple 163 and engaging the under side of the valve member 166. A plunger 171 mounted in a guide 172 has a head 173 engaging a spring 174. The rounded end 175 of plunger rod 171 is adapted to be engaged by a cylindrical cam member 176 on controlling valve shaft 57 when the same has been turned to the "oxygen direct" position, whereupon the plunger 171 will be depressed, carrying with it valve disc 156 which will be held by strong spring pressure against the valve seat 167, thus shutting off chamber 169 from rebreathing bag 164.

At the time that this movement takes place a second and elongated cylindrical cam 177 on shaft 57 and drum 54 will be caused to engage a lever 178 pivoted at 179 in chamber 49, Figs. 5 and 11. The lever 178 engages the rounded end 180 of a plunger shaft 181 mounted in a guide tube 182 and being connected with a gastight rubber diaphragm 183, by which leakage of gas from chamber 49 is effectively prevented. The lower end 184, Figs. 5 and 6, of plunger rod 181 engages a ball 185, seated in a socket on a lever 186 pivoted at 187. In Fig. 6 the cam roller 177 is shown in engagement with the lever 178 so that the plunger rod has been depressed. This has resulted in raising the long arm 188 of the lever carrying with it from the dotted line position indicated at 189, Fig. 6, to the full line position, a spool roller 190 upon which rests a lever 191.

The lever 191 has its rear end 192 held between arms 193 and upon the spool roller 190 by a powerful spring 194 housed in the casing 195 of regulating valve 22. The spring 194 projects a collar 196 against the wedge shaped forked end 197 of lever 191, which end is formed with a curved walled aperture 198 surrounding a cylindrical shank 199 secured to the collar 196. The cylindrical shank 199 is threaded at 200 and receives thereon a nut 201 which forms a fulcrum abutment at 202 engaging the upper part of lever 191, as clearly shown in Fig. 6. The end 197 of lever 191 is thus held between the collar 196 and the nut 201, the space between these members being adjustable by screwing in or out the nut 201, which is held fixed thereon by a set screw, not shown. The collar 196 is provided with pins 203 which extend slidably through holes in the top of casing member 195 and engage a plate 204 on top of spring 194. The spring 194 is seated against a follower 205 which engages a diaphragm 206 subject to pressure of gas in chamber 207 of regulating valve 22. The thrust of the short arm 197 of lever 191 fulcrumed at 202 is sufficient to operate through spring 194, compressing it slightly so as to overcome the pressure of the gas against diaphragm 206 and move the diaphragm downwardly. This diaphragm engages a U-lever 208, which in turn engages a slidable valve member 209 taking it away from the valve seat 210, as clearly shown in Fig. 6, and permitting gas to flow from regulator valve chamber 207 through ports 211 and 212 into pipe 39 and thence into chamber 46, whence it goes directly to the patient intermittently in response to breathing, in a manner which will now be described.

Referring to Figs. 7 and 11, movement of the controlling valve drum 54 to the "oxygen direct" position will cause cam roller 213 to engage arm 70 and cause the fork arm 91 connected therewith to engage head 108 and lift valve 102 to open the same past valve seat 103. This allows the oxygen to flow through valve chamber 214 into pipe 215. As clearly shown in Figs. 11 and 15, pipe 215 leads through a passageway 216 past a check valve 217 into a chamber 218, thence through a pipe 219 into a chamber 220 within a casing formed of several sections 221, 222 and 223 secured together in gas-tight relation.

From chamber 220 leads a passageway 224 which is topped by an annular valve seat 225 adapted to be engaged by a valve plate 226 on a plunger 227 within a cylindrical casing 228 which is secured in a main casing 229 of a breathing-responsive valve chamber 230. A diaphragm 231 overlies chamber 230 and is subject to the pressure of gas within said chamber. The diaphragm is connected by means of a lever 232 pivoted to a post 233 at the center of the diaphragm with a plunger rod 234 which in turn is connected with the valve plunger 227, the latter being held spaced from the inner walls of the casing 228, as clearly indicated at 235 of Fig. 5. The spring 236 tends to push the diaphragm 231 downwardly into valve opening position against any pressure of gas in chamber 230, and the force of this spring is adapted to be regulated by a member 237 having a spiral groove 238 and held for rotation in a cylindrical stand 239. A cap 240 secured to the rotatable member 237 carries a pointer 241 and constitutes a thumb screw by which the member 237 may be rotated between limits determined by a pin 242 on the stand 239 positioned within a cut-out portion 243 of thumb screw cap 240, and engageable with the ends of said cut-out portion, as indicated in dotted lines at 244 of Fig. 5.

This adjusting mechanism is supported upon a main cap or cover construction 245 secured to the top of casing 229 and over the margins of diaphragm 231. The passageway 160 heretofore referred to is within a tubular casing 246 and said passageway 160 thus is adapted to receive gas at its lower portion from the passageway 159 heretofore described and at its upper opening 247 directly from chamber 230. Having reference to Fig. 5 it will be noted that an annular space 248 surrounds the lower portion of tube 246 from which gas from passageway 159 passes the interior of passageway 160 from openings 249 in said tubular member. Also the tubular member 246 is surrounded by a second annular passageway 250 to which gas in passageway 160 passes through openings 251, and thence into passageway 161 and to the breathing tube 117, as hereinbefore described.

The above instrumentalities comprise a breathing-responsive means for delivering gas intermittently to the patient as he breathes. Thus, inhalation tends to reduce pressure in chamber 49, passageway 161, passageway 160 and chamber 230, which permits the spring 236 to force diaphragm 231 downwardly and lift the valve member 227 whereupon gas from passageway 224 may pass over the valve seat 225 and through the passageway 235 surrounding valve chamber 227 and into chamber 230 and thence through the connected passageways heretofore described to the breathing tube 117 and the patient. Fig. 5 shows the parts in position when an inhalation has so reduced pressure and is producing a flow of gas.

This, for the instrumentalities defined, results in delivery of oxygen alone from chamber 46 through pipe 215 when the parts are in the position indicated in Figs. 4, 6 and 7, wherein the oxygen valve 102 leading from chamber 46 has been opened, the main oxygen delivery valve 210 has been widely opened by operation of the lever 191, and the rebreathing bag 164 has been closed. With the parts in this position, it will be apparent that the patient will be breathing oxygen and only oxygen, delivered in full volume, thus providing, instantly available, the most efficient possible resuscitation means.

The means for delivering nitrous oxide alone follows a similar course, except that it does not go through the check valve mechanism 217, 217a. For this purpose the cam roller 252 on control drum 54, Fig. 9, has engaged ball end of member 69 and operated the lever fork 91 to lift valve 102, thus opening chamber 32 to chamber 253 from which a pipe 254 leads directly through the lower casing section 223 into the chamber 220 connected with passageway 224. It follows that when the parts are in the position of Fig. 9, nitrous oxide alone will pass to valve chamber 230, and thence to the patient in the same manner as pure oxygen. This of course is the position on the control valve dial, Fig. 1, indicated as "Direct N2O."

It has heretofore been stated that mixture of nitrous oxide and oxygen in predetermined proportions may be delivered intermittently in response to the patient's breathing, as well as continuously, when this is desired. In the position of the three-way valve 157, shown in Fig. 11, the delivery of mixture is continuous, as heretofore described. When, however, this valve, by means of handle 255 is turned 45° to its opposite position, the mixture will be delivered through passageway 256 in the valve casing 257 and thence through a vertical passageway 258 to a pipe 259 and thence from passageway 216 in check valve casing 260 past check valve 217a and into chamber 218. From chamber 218 the gas mixture goes through a pipe 261 through middle section 222 of casing forming chamber 220, into said chamber 220, and thence through passageway 224 past valve 226 to valve chamber 230 whence it passes to the breathing line of the patient as heretofore indicated. The control valve drum 54 in this case, the same as where mixture goes continuously to the patient, is in the position marked on the dial as "Mixture," which is the position shown in Fig. 8, wherein both the nitrous oxide and oxygen valves are open to their respective passageways leading to the central proportioning valve 122 and wherein the valve 166 is in the position shown in Fig. 5, leaving chamber 49 open to rebreathing bag 164.

The check valve 217 in the mixture line and the check valve 217a in the oxygen line going to the breathing-responsive valve chamber 230 are for the purpose of maintaining constant the proportions of mixture fixed and also preventing contamination of pure oxygen or pure nitrous oxide when those are delivered. It will be apparent that when nitrous oxide is delivered its pressure will be against both the check valves 217 and 217a and will prevent inflow of nitrous oxide either to the mixture side or to the oxygen side, but particularly such flow to the mixture side. When pure oxygen is being delivered the mixture check valve 217a likewise will prevent any flow of oxygen into the mixture passageways, thus maintaining constant the mixture proportions as fixed. Also without these check valves, when either nitrous oxide alone or mixture is going to the breathing-responsive valve, there is a tendency to trap gas with some back pressure in the oxygen gage chamber so the gage apparently shows delivery of oxygen when none is being delivered, and the above indicated check valve means prevents this misleading indication either when nitrous oxide alone or oxygen nitrous oxide mixture is being delivered.

Referring to Figs. 8, 11 and 14, it will be noted that the lower pair of valve operating rollers 262 and 263 engage the nitrous oxide valve arm 69 and the oxygen valve arm 70 and operate these two arms to open the valves for delivery of these two gases to the proportioning valve which provides delivery of mixture. A similar pair of roller valve operators 264 and 265 are positioned much closer together and at a point higher on the drum 54 and are adapted to engage the upper portion of valve operating arms 69 and 70. But while valve operating rollers 262 and 263 will simultaneously engage the balls 266 and 267 of actuating arms 69 and 70 for operating the nitrous oxide and oxygen valves simultaneously, the valve operating rollers 264 and 265 do not engage these balls simultaneously but severally and successively for operating the nitrous oxide valve and the oxygen valve in individual and distinct positions, when either oxygen or nitrous oxide is called for by itself.

The drum 54 also carries a pair of stops 268 and 269 which serve a purpose later to be described. Stop pins 270 and 271, shown in section in Fig. 11, in full lines in Fig. 5, are adapted to be engaged by one or the other of walls 272 or 273 of member 111, which limit the movements of the valve drum in both directions, the limit in one direction being for the position of delivery of oxygen alone, and in the other position, for delivering nitrous oxide alone. These pins, as clearly shown in Fig. 5, are carried from the cap member 50. This cap member is also provided with a series of depressions 274 adapted to receive the rounded end 275 of a peg 276 which is seated in a channel 277 with a spring 278 adapted to force the pin 276 outwardly. The depressions 274 are spaced in the cap corresponding to the several operating positions of the valve indicated on the dial 51 as "Oxygen direct," "Shut," "Mixture," "Patient control," and "Nitrous oxide direct." This arrangement serves definitely to hold set in its several operative positions the valve operating drum 54.

The patient control operation is very well shown in Figs. 2, 8 and 9. A compressible rubber bulb 279 adapted to be held in the hand of the patient and to be compressed by the patient as he may desire, is connected by means of a rubber tube 280 to a U-tube 281 having its branches 282 and 283 united to nipples 284 and 285. Each of these nipples is provided with a channel 286 leading respectively into a chamber 287 formed in each of casings 288 and 289.

In each of the chambers 287 which are circular in horizontal section, is located a diaphragm 290 which engages a head 291 held against the diaphragm by a spring 292, see Fig. 9. The casings 288 and 289 are carried by members 293 and 294 threaded into the heavy bottom portion 53 at 295, as clearly shown in Fig. 9. The members 293 and 294 are provided with a central bore 296 in which are slidably held pusher pins 297 and 298, the curved ends 299 of which extend into the valve operator chamber 49. As shown in Fig. 8, these curved ends 299 are held so as to underlie the valve operating members 69 and 70 which will be directly above the ends 299 of pusher pins 297 and 298.

When, in this position, the patient squeezes the bulb 279, air will be forced into the chambers 287 under the diaphragms 290 which will act as pistons to thrust upward the pusher pins 297 and 298. These pusher pins, engaging the operator arms 69 and 70, will put the parts in the same positions as those shown in Fig. 8, in which mixture is delivered to the patient. Closing of the bulb 279 will open either for two or three breaths of mixture, when a release valve, not shown, will permit spring 292 to retract the pusher pins 297 and 298, after which the patient can repeat the operation. Before such patient control operation, the operator levers 69 and 70 will be in the neutral or inoperative position, as shown in Fig. 10.

This showing is for the "shut" position, in which the ball head 266 of operator arm 69 is indicated as engaging the pin 268 on the valve operator drum 54 so that the pusher pin 297 (and pin 298 underlying the arm 70) would have no effect upon the valve operator levers 69 and 70 because restrained by the pins 268 and 269. When, however, the drum has been moved to the "patient control" position, there will be no pins 268 and 269 above the balls 266 and 267 on arms 69 and 70, so that operation of the valve apparatus may be effected by the patient.

Referring to Figs. 3, 6 and 8, it will be noted that a threaded pusher rod 300 having thereon a thumb screw 301 is threaded through the cylindrical shank member 199 and has a pin head 302 engageable with the pusher plate 204 by which the spring 194 may be compressed more or less for increasing or decreasing the pressure of the spring on the diaphragm 206. Upon this pusher rod 300 is adjustably secured a piece 303 provided with a flange collar 304 and an intervening annular groove 305. Pivoted at 306 to a bracket stand 307 is an arm 308, Fig. 3, having an end 309 adapted to be engaged by the flange collar 304. The stand 307 is supported on a pin 314 fast on the wall 315 surrounding chamber 109a, see Fig. 8. Connected with the outer end of lever 308 is a pusher pin 308' which carries a valve head 310 adapted to be moved against pressure of spring 311, Fig. 8, to open valve at valve seat 312 and allow gas to escape through channel 313 to atmosphere through port 314'. A valve chamber 315' is in communication through pipe 313 with oxygen gas trapped in the regulating valve chamber 207. When, therefore, the pusher rod 300 is turned by the thumb nut 301 to take pressure off of plate 204 and spring 94, it will, through the flange collar 304 shift the valve at 310, 312, at the same time effectively cut off delivery of oxygen, and permit release of trapped oxygen gas.

Figure 16:
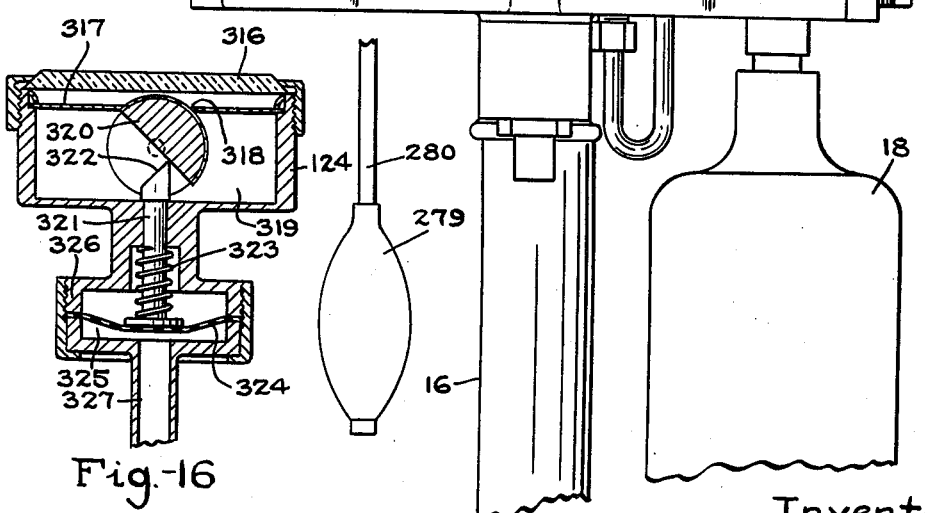
Fig. 16 is a section taken through the nitrous oxide gage showing the manner in which the "off" and "on" cylinder is operated.

Referring to Fig. 16, the gage 124 has the usual transparent cover 316 under which is an opaque plate 317 provided with a rectangular opening 318. Rotatably mounted in chamber 319 within gage casing 124 is a half-cylinder 320 which has on it the two words "Off" and "On" and which is normally held by a spring, not shown, in position to display the word "Off." A plunger 321 engages with its angularly disposed nose 322 the face of the half-cylinder 320. The plunger is normally held retracted by a spring 323 against a diaphragm 324 within a chamber 325 in a casing 326. The part of the chamber 325 below the diaphragm 324 is entered by a pipe 327 to which feeds the pipe 123 heretofore described, Figs. 1 and 2.

Whenever measured nitrous oxide gas is not flowing, the half-cylinder 320 and the plunger 321 engaging it will have the position as in Fig. 16. When however, measured nitrous oxide gas is flowing, the pressure of gas in chamber 325 beneath diaphragm 324 will cause the plunger to push upwardly and shift the half-cylinder so that the word "On" on said half-cylinder will appear in view through the opening 318. Thus the operator obtains instant information from the most casual inspection, that nitrous oxide is, or is not, flowing. If flowing, the measure of the nitrous oxide is of course determined by the operation of center valve member 122 through thumb nut 131.

The advantages of my invention will be apparent from the foregoing description. The fundamental advantages may be summed up in the statement that in a compactly assembled and relatively inexpensive machine, means are provided at all times instantly available to the anesthetist for completely regulating the administration of nitrous oxide and oxygen gases, either in mixtures of proportions predetermined by the operator, or separately, and for mixture either continuously or intermittently in response to the patient's breathing, and for separate administration of oxygen or nitrous oxide always continuously and in increased volumes for purposes of quick increase of anesthesia or resuscitation as the condition of the patient requires. In addition, the machine is provided with efficient patient control means whereby the patient himself can administer mixture, the proportions of which will have been determined by the operator, and whether delivered continuously or intermittently also will have been determined by the operator.

A fundamental and highly important advantage of my invention resides in the provision of a valve operating chamber and controlling valve therein with various operating instrumentalities entering said chamber, and wherein gas leakages, either from the chamber or to the chamber, are effectively prevented, while at the same time permitting the necessary movements of the operating means to points outside of the chamber, with a single controlling member entering the chamber and effectively sealed from gas leakage, whereby positioning to effect any of the above noted operations is accomplished by the simple turning of a single hand lever to stopped positions indicated on a dial by a pointer moving with the lever.

Other advantages reside in the availability of all operating parts for control by the operator and indications which show the results to be obtained by operation of the parts, all compactly presented to the eye of the operator and within easy reach of his hand in the closest practical compass.

I claim:

1. In an anesthetizing machine, a mixing chamber and means for independently delivering a plurality of gases thereto including a valve for determining the proportions of said gases in the mixture, a breathing-responsive chamber and means for conveying each of said gases independently thereto, including a pair of distributor valve chambers each having gas delivery connections to the proportioning valve and mixing chamber on the one hand and to the breathing-responsive chamber on the other, a control valve mechanism including a rotary member and independent movable members actuated thereby, one movable member extending into each distributor valve chamber, means in each distributor valve chamber adapted to be actuated by said movable members for effecting delivery of all said gases to the proportioning valve and mixing chamber or of any one of said gases separately to the breathing-responsive chamber as desired, and means under control of the operator for rotating said member.

2. In an anesthetizing machine, a gas distributor valve chamber, means for delivering gas under pressure thereto, a plurality of valve members within said chamber for independently controlling the delivery of gas therefrom to different and independent instrumentalities, a movable member extending into said valve chamber and provided with means thereon for actuating any of said valves independently of any other valve, said movable member having an arm extending outside of said valve chamber mounted for rocking movements, and means under the control of the operator for engaging said outwardly extending arm to rock it to cause independent operation of the selected valve member.

3. In an anesthetizing machine, a gas distributor valve chamber, means for delivering gas under pressure thereto, a plurality of valve members within said chamber for independently controlling the delivery of gas therefrom to different and independent instrumentalities, a movable member extending into said valve chamber and provided with means thereon for actuating any of said valves independently of any other valve, said movable member having an arm extending outside of said valve chamber mounted for rocking movements, means under the control of the operator for engaging said outwardly extending arm to rock it to cause operation independent of a selected valve member, and means providing a gas-tight seal of said valve chamber in the area of movement of said movable member.

4. In an anesthetizing machine, a gas distributor valve chamber embodying a plurality of valves, a movable member having a part extended within said chamber for severally operating the valves, said member being formed with a surrounding ball shaped bearing piece, a fulcrum support for said member formed with a socket engageable with the walls of said ball, and means associated with said ball and fulcrum support permitting movement of the member and forming a gas-tight seal to the distributor chamber.

5. In an anesthetizing machine, a gas distributor valve chamber embodying a plurality of valves, a member for severally operating the valves consisting of a stem formed in two parts with complementary hemispherical portions at their point of union to form a ball, a fulcrum support for said member formed with socket portions engageable with the walls of said ball, and a flexible disc held between the hemispherical portions so as to permit movement of the member and form a gas-tight seal to the distributor chamber.

6. In an anesthetizing machine, a gas distributor valve chamber embodying a pair of valves with oppositely disposed stems, a movable member having a part extended within said chamber and a pair of forks embracing said stems for severally operating the valves, a ball and socket fulcrum support for said member, and means for rocking said member on said support to operate a selected one of the valves, said forks restraining the member to move in the plane of the valve stems.

7. In an anesthetizing machine, a gas distributor valve chamber provided with a plurality of valves within the chamber, means for delivering gas under pressure to said chamber, a member for operating the valves with a part in the valve chamber and a part outside the valve chamber, a fulcrum support for said member in a wall of the chamber, means to effect rocking of the member to operate the valves, separately and independently, and a flexible disc sealed in said support and in a wall of the chamber so as to permit said rocking movement of the member and form a gas-tight seal to the chamber.

8. In an anesthetizing machine, a gas distributor valve chamber embodying a pair of valves with oppositely disposed stems, a member for severally operating the valves consisting of a shank formed in two parts with complementary hemispherical portions at their point of union to form a ball, and with a pair of forks embracing said stems, a fulcrum support for said member formed with socket portions engageable with the walls of said ball, a flexible disc held between the hemispherical portions so as to permit movement of the member and form a gas-tight seal to the distributor chamber, and means for rocking said member on said support to operate a selected one of the valves, said forks restraining the member to move in the plane of the valves 9. In an anesthetizing machine, a gas distributor valve chamber embodying a pair of valves with oppositely-disposed stems, a movable member having parts extending within and without said chamber, a pair of forks embracing said stems for severally operating the valves, a ball and socket fulcrum support for said member, and a rotatable valve operator provided with roller contact members positioned to engage on one side or the other the end of the member without the chamber to operate a selected one of the valves, said forks restraining the member to move in the plane of the valve stems.

10. In an anesthetizing machine, a gas distributor valve chamber embodying a pair of valves with oppositely-disposed stems, a movable member having parts extending within and without said chamber, a pair of forks embracing said stems for severally operating the valves, a ball and socket fulcrum support for said member, a rotatable valve operator provided with roller contact members positioned to engage on one side or the other the end of the member without the chamber to operate a selected one of the valves, said forks restraining the member to move in the plane of the valve stems, and means running through said fulcrum for effecting a gas-tight seal while permitting operation of the movable member.

11. An anesthetizing machine comprising a gas distributor valve chamber to which oxygen gas under pressure is delivered, a mixing chamber and a separate breathing-responsive chamber, a pair of valve members associated with said gas distributor chamber for independently controlling the delivery of oxygen gas therefrom to the mixing chamber or to the breathing-responsive chamber, means including a rotary member for independently operating said valves, an oxygen flow valve, and means including a lever actuated by the rotary member for effecting increased flow of oxygen when the oxygen is caused to go to the breathing-responsive valve.

12. An anesthetizing machine comprising sources of supply of oxygen and nitrous oxide under pressure, a breathing line including a mixing chamber and a hand-operated proportioning valve to which said gases may be delivered, the proportioning valve having associated therewith means for indicating the measured amount of nitrous oxide being delivered, a gauge embodying part of a drum, and a spring-retracted plunger for operating the drum actuated by the pressure of nitrous oxide gas indicate volume of flow thereof when the same is being delivered to the proportioning valve, means holding said drum normally positioned to display the word "Off" when no measured nitrous oxide gas is flowing, and when the drum is operated by the pressure of the nitrous oxide gas being caused to display the word "On" when measured nitrous oxide gas is flowing.

13. In an anesthetizing machine, a central valve operator chamber, a pair of valve chambers located on either side thereof and having flexible sealing closures between the operator chamber and the valve chambers, means for delivering oxygen to one valve chamber and nitrous oxide to the other valve chamber, a plurality of valves in each valve chamber, a valve operator in the operator chamber, rockable levers for operating the valves extending from the valve chambers through the sealing closures into the operator chamber, and means on the operator for engaging said levers in different positions of the operator to effect different operations of the valves in the valve chambers.

14. In an anesthetizing machine, a central valve operator chamber, a pair of valve chambers located on either side thereof and having flexible sealing closures between the operator chamber and the valve chambers, means for delivering oxygen to one valve chamber and nitrous oxide to the other valve chamber, a plurality of valves in each valve chamber, a valve operator drum in the operator chamber, rockable levers for operating the valves extending from the valve chambers through the sealing closures into the operator chamber, and a series of differentially positioned contact members on the operator drum for engaging said levers in different positions of the drum to effect independent operations of the several valves in the valve chambers.

15. In an anesthetizing machine, a central valve operator chamber, a pair of valve chambers located on either side thereof and having flexible sealing closures between the operator chamber and the valve chambers, means for delivering oxygen to one valve chamber and nitrous oxide to the other valve chamber, a valve operator drum in the operator chamber, fulcrum levers for operating the valves extending from the valve chambers through the sealing closures into the operator chamber, said levers having ball shaped ends in the operator chamber, and a series of differentially positioned rollers on the operator drum for engaging said levers in different positions of the drum to effect operation of the valves in the valve chambers.

16. In an anesthetizing machine, a central valve operator chamber, a pair of valve chambers located on either side thereof and having flexible sealing closures between the operator chamber and the valve chambers, means for delivering oxygen to one valve chamber and nitrous oxide to the other valve chamber, a valve operator drum in the operator chamber, fulcrum levers for operating the valves extending from the valve chambers through the sealing closures into the operator chamber, and a set of rollers on the drum adapted to rock the fulcrum levers simultaneously in one direction in one position of the drum, and a second set of rollers on the drum adapted to rock the fulcrum levers separately and independently in the opposite direction in other positions of the drum.

17. In an anesthetizing machine, a valve operator chamber, a valve chamber located adjacent thereto, means sealing the valve chamber from the operator chamber, means for delivering oxygen to the valve chamber, a valve in the valve chamber and connections for delivering oxygen only into the breathing line, a rockable member extending through the sealing means and having a portion in the valve chamber and another portion in the operator chamber, an operator drum in the operator chamber having means thereon for engaging the rockable member in one position of the drum and rocking it to operate the oxygen valve, a valve for controlling the rate of flow of oxygen, a plunger and lever adapted to be actuated thereby for operating said last-named valve, and a pivoted lever in the operator chamber and a roller on the drum engageable therewith to actuate the plunger to operate the oxygen control valve and increase the rate of flow of oxygen when the first-named oxygen valve is operated.

18. In an anesthetizing machine, a valve operator chamber, a valve chamber located adjacent thereto, means sealing the valve chamber from the operator chamber, means for delivering oxygen to the valve chamber, a valve in the valve chamber and connections for delivering oxygen only into the breathing line, a rockable member extending through the sealing means and having a portion in the valve chamber and another portion in the operator chamber, an operator drum in the operator chamber having means thereon for engaging the rockable member in one position of the drum and rocking it to operate the oxygen valve, means operated by the operator drum to increase the rate of flow of oxygen when the oxygen valve is operated, a rebreathing bag, a valve for closing the rebreathing bag having a stem extending into the operating chamber, and a member on the valve operator engageable with the valve stem for operating the valve to cut out the rebreathing bag from the breathing line when the operator is moved to the position for operating said first-named oxygen valve.

JAY A. HEIDBRINK.